US009191058B2

(12) United States Patent
Hiscock (10) Patent No.: US 9,191,058 B2
(45) Date of Patent: Nov. 17, 2015

(54) CHIRP COMMUNICATIONS (71) Applicant: Cambridge Silicon Radio Limited, Cambridge (GB)

(72) Inventor: Paul Dominic Hiscock, Cambridge (GB)

(73) Assignee: Cambridge Silicon Radio Limited, Cambridge (GB)

(*) Notice: Subject to any disclaimer, the term of this patent is extended or adjusted under 35 U.S.C. 154(b) by 0 days.

(21) Appl. No.: 14/713,274

(22) Filed: May 15, 2015

(65) Prior Publication Data

US 2015/0249480 A1 Sep. 3, 2015

Related U.S. Application Data (63) Continuation of application No. 13/596,435, filed on Aug. 28, 2012, now Pat. No. 9,065,548.

(30) Foreign Application Priority Data

Aug. 31, 2011 (GB) .................................. 1114975.4

(51) Int. Cl.
*H04B 1/00* (2006.01)
*H04B 1/69* (2011.01)
(Continued)

(52) U.S. Cl.
CPC .............. *H04B 1/69* (2013.01); *H04J 13/0062* (2013.01); *H04L 1/0002* (2013.01); *H04L 27/2607* (2013.01); *H04B 2001/6912* (2013.01)

(58) Field of Classification Search
CPC .. H04B 1/69; H04B 2001/6912; H04B 3/542; H04B 1/7163; H04B 1/717; H04B 1/7172; H04B 1/7174; H04L 27/2607; H04J 13/0062
See application file for complete search history.

(56) References Cited

U.S. PATENT DOCUMENTS 5,454,005 A 9/1995 O'Clock et al.
5,835,529 A * 11/1998 Koga et al. .................... 375/131
(Continued)

FOREIGN PATENT DOCUMENTS

GB 2490177 10/2012

OTHER PUBLICATIONS

GB Search Report for GB Application No. GB 1114975.4, dated Nov. 26, 2012.
(Continued)

*Primary Examiner* — Ted Wang
(74) *Attorney, Agent, or Firm* — Procopio, Cory, Hargreaves & Savitch LLP (57) ABSTRACT A method of communicating a data chirp signal from a transmitter to a receiver, the data chirp signal comprising a sequence of symbols, each symbol encoding a first symbol value and a second symbol value such that the data chirp signal comprises a first symbol value sequence and a second symbol value sequence, the first and second symbol values being encoded via different properties of the symbol, the first symbol value sequence being selected from values in a primary predetermined sequence and a secondary predetermined sequence, the method comprising: selecting consecutive values of the first symbol value sequence from values in consecutive sequence positions of the primary predetermined sequence and the secondary predetermined sequence; encoding first data in the chirp signal via the selected first symbol value sequence; encoding second data in the chirp signal via the second symbol value sequence; and transmitting the data chirp signal to the receiver.

14 Claims, 7 Drawing Sheets (51) Int. Cl.
*H04L 1/00* (2006.01)
*H04L 27/26* (2006.01)
*H04J 13/00* (2011.01)

(56) References Cited

U.S. PATENT DOCUMENTS 6,064,695 A * 5/2000 Raphaeli ..................... 375/230
7,511,637 B2 3/2009 Rushanan
2003/0156624 A1 8/2003 Koslar
2008/0310479 A1 12/2008 Koslar et al.
2012/0320950 A1 12/2012 Hiscock

OTHER PUBLICATIONS

Office Action for U.S. Appl. No. 13/596,435, mailed Sep. 25, 2014.
Notice of Allowance for U.S. Appl. No. 13/596,435, dated Feb. 17, 2015.

* cited by examiner

| Primary sequence | 0 | 8 | 9 | 2 | 3 | 4 | 6 | 7 | 3 | 2 | 8 |
| --- | --- | --- | --- | --- | --- | --- | --- | --- | --- | --- | --- |
| Secondary sequence | 9 | 2 | 1 | 8 | 7 | 6 | 4 | 3 | 7 | 8 | 2 |
| Selected sequence | 0 | 8 | 9 | 2 | 3 | 4 | 6 | 7 | 3 | 2 | 8 |
| Binary code | 0 | 0 | 0 | 0 | 0 | 0 | 0 | 0 | 0 | 0 | 0 |

FIG. 4a

| Primary sequence | 0 | 8 | 9 | 2 | 3 | 4 | 6 | 7 | 3 | 2 | 8 |
| --- | --- | --- | --- | --- | --- | --- | --- | --- | --- | --- | --- |
| Secondary sequence | 9 | 2 | 1 | 8 | 7 | 6 | 4 | 3 | 7 | 8 | 2 |
| Selected sequence | 9 | 8 | 1 | 2 | 3 | 6 | 4 | 7 | 7 | 8 | 8 |
| Binary code | 1 | 0 | 1 | 0 | 0 | 1 | 1 | 0 | 1 | 1 | 0 |

CHIRP COMMUNICATIONS

CROSS REFERENCE TO RELATED APPLICATION

This application is a Continuation of U.S. application Ser. No. 13/596,436, filed Aug. 28, 2012, entitled "Chirp Communications", the contents of which are incorporated herein by reference.

FIELD OF THE INVENTION

The present disclosure relates to chirp communications, and in particular to efficiently encoding data in a chirp signal.

BACKGROUND

The chirp modulation method is a modulation method in which the frequency of a signal (chirp) varies linearly over time in a bandwidth of Fs Hz. A chirp having a positive gradient in the frequency-time plane is generally referred to as an up-chirp, for example chirp 1 and chirp 2 on FIG. 1. A chirp having a negative gradient in the frequency-time plane is generally referred to as a down-chirp, for example chirp 3 on FIG. 1.

Figure 1:
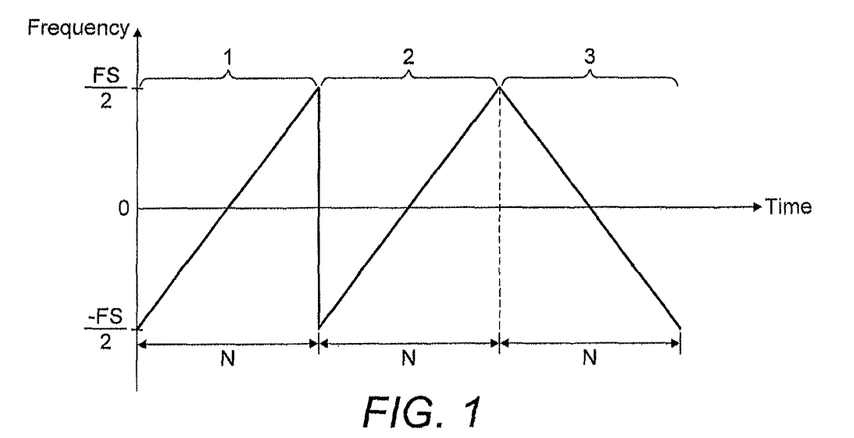
FIG. 1 illustrates a sequence of chirps in the frequency-time plane.

A chirp can be represented by a sequence of N samples. One or more identical contiguous chirps can form a symbol that represents a data value to be communicated. A chirp can be represented mathematically as:

$$C(g,p) = e^{j\pi g(n - fn(p))(n+1 - fn(p))/N} \quad \text{(equation 1)}$$

where g is the gradient of the chirp, N is the number of samples in the sequence, n is a sample in the sequence, p is a symbol value, fn(p) is a function that encodes p onto the received chirp, which implicitly may also be a function of g, n, N and other constants, and C is the received chirp sequence, which is normally evaluated for all integer values of n from 0 to N−1 in order. The number of valid values of p is the symbol set size, which is nominally N. However, the symbol set size can be more or less than N depending on the quality of the link. The value of g can have any value greater than 0 and less than N. Preferably, g is an integer between 1 and N−1. Due to the modular nature of this expression negative gradients are obtained from N−1 backwards. Hence, N−2 is equivalent to a negative gradient of −2. Where there are more than one identical contiguous chirps in a symbol, each chirp individually conveys the same value which is the symbol value of the symbol. Chirp 1 in FIG. 1 has a starting frequency of −Fs/2 and a gradient of 1. It increases linearly in frequency over a period of N samples at a sample rate of Fs to reach a frequency close to +Fs/2. Since this is a complex sampled system +Fs/2 is the same as −Fs/2. Multiple chirps are usually contiguous but may start with a different frequency. The signal phase is typically made continuous throughout a sequence of chirps. In other words, after the signal has reached +Fs/2 at n=N−1, the next symbol starts with n=0 again. FIG. 1 illustrates an example in which two consecutive chirps have the same symbol value, whereas the third chirp is different. An apparent discontinuity in frequency between chirp 1 and chirp 2 occurs at n=N.

Figure 2:
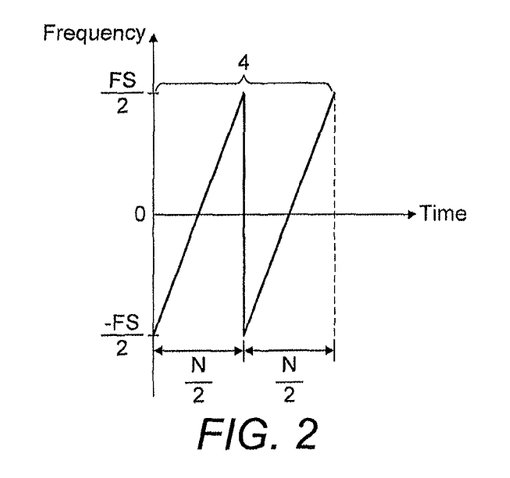
FIG. 2 illustrates a chirp having a gradient of 2 in the frequency-time plane.

Chirp 4 in FIG. 2 has a gradient of 2 and a starting frequency of −Fs/2. Because it has double the gradient of the chirps of FIG. 1, it increases linearly in frequency to +Fs/2 in half the number of samples that the chirps in FIG. 1 do, i.e. it reaches close to +Fs/2 after close to N/2 samples. The chirp then wraps around in frequency. Since this is a sampled system, these frequency wraps are in effect continuous and have continuous phase. The chirp repeats the frequency sweep from −Fs/2 to +Fs/2 between samples N/2 and N.

The chirps also have continuous frequency and phase from one end of the chirp to the other. A cyclic shift of the samples that make up a chirp creates another valid chirp.

Chirp communications are typically used in low cost, battery powered systems operating using low data rates and short messages, often in noisy environments or over long distances. As a result of these constraints every transmitted data bit is valuable. Irregular control data reduces the efficiency of the communication. Thus, a method for transmitting more data within a given bandwidth and a means to manage irregular control data is desirable.

For example, when two devices are communicating with an agreed data rate and quality of service (QoS) it is desirable that each transmitted symbol is as long as possible to enhance its likelihood of being received correctly. Hence, during normal operation it is desirable for the main payload information to fully occupy the available transmit time for the duration of the connection. However, there may be occasions when additional control information also needs to be transmitted, for example to change power levels, adjust the link quality, provide additional parity bits for sensitive symbols or to indicate that a frame needs to be retransmitted. This additional information is generally transmitted much less frequently than the payload information and may not necessarily be transmitted regularly. In a conventional communication system provision is made for control information in the form of additional control packets that are exchanged between devices, often at regular intervals. In one method, these control packets are embedded serially in between payload packets using time division multiple access (TDMA). In this case less time is available for the payload packets and hence more power is required for the same receiver sensitivity. In a second method, control packets are transmitted at the same time as the payload packets but use a different frequency, for example utilising frequency division multiple access (FDMA). In this case more spectral resources, more battery power and a more complicated radio are required, which is not consistent with a very cheap and low power receiver. In a third method, control packets are transmitted at the same time and the same frequency as the payload packets but use a coding scheme, such as code division multiple access (CDMA). In this case the receiver suffers crosstalk interference between the payload packets and the overlaid control packets. This method thus requires additional power for the payload packets to achieve the same receiver sensitivity. It also requires more power to transmit the additional control packets. CDMA receivers are also expensive.

Thus, there is a need for an improved method of communicating a chirp signal from a transmitter to a receiver that is spectrally efficient and provides a means to convey irregular control information without a significant power or delay penalty on the payload information.

SUMMARY

According to a first aspect, there is provided a method of communicating a data chirp signal from a transmitter to a receiver, the data chirp signal comprising a sequence of symbols, each symbol encoding a first symbol value and a second symbol value such that the data chirp signal comprises a first symbol value sequence and a second symbol value sequence, the first and second symbol values being encoded via different properties of the symbol, the first symbol value sequence being selected from values in a primary predetermined sequence and a secondary predetermined sequence, the method comprising: selecting consecutive values of the first symbol value sequence from values in consecutive sequence positions of the primary predetermined sequence and the secondary predetermined sequence; encoding first data in the chirp signal via the selected first symbol value sequence; encoding second data in the chirp signal via the second symbol value sequence; and transmitting the data chirp signal to the receiver.

Suitably, the first data encodes a link parameter renegotiation request.

Suitably, the method further comprises: determining a drift between the transmitter and the receiver; and determining that the drift is greater than a threshold value, wherein the first data encodes a request to increase the bandwidth of chirp communications between the transmitter and the receiver.

Suitably, each symbol comprises one or more identical chirps, and the method further comprises: determining a quality of the link between the transmitter and the receiver; and determining that the link quality is below a threshold value, wherein the first data encodes a request to increase the length of each chirp in each symbol.

Suitably, the first symbol values are encoded via the gradients of the symbols. Alternatively, the first symbol values are encoded via the centre frequencies of the symbols. Alternatively, each symbol's first symbol value is encoded via the bandwidth of the symbol. Alternatively, each symbol comprises one or more identical chirps, each symbol's first symbol value being encoded via the length of each chirp in the symbol.

Suitably, the method further comprises each symbol encoding at least one further symbol value such that the data chirp signal comprises at least one further symbol value sequence, the at least one further symbol value being encoded via a different property of the symbol to the first and second symbol values, wherein encoding first data comprises encoding first data in the chirp signal via the selected first symbol value sequence and via the at least one further symbol value sequence.

Suitably, the at least one further symbol value is encoded via one of: the gradient of the symbol, the centre frequency of the symbol, the length of each chirp in the symbol, and the bandwidth of each symbol.

Suitably, the first symbol value sequence is selected from values in the primary predetermined sequence, the secondary predetermined sequence and at least one further predetermined sequence, the method comprising selecting consecutive values of the first symbol value sequence from values in consecutive sequence positions of the primary predetermined sequence, the secondary predetermined sequence and the at least one further predetermined sequence.

According to a second aspect, there is provided a method of receiving a data chirp signal at a receiver, the data chirp signal comprising a sequence of symbols, each symbol encoding a first symbol value and a second symbol value such that the data chirp signal comprises a first symbol value sequence and a second symbol value sequence, the first and second symbol values being encoded via different properties of the symbol, the first symbol value sequence being selected from values in a primary predetermined sequence and a secondary predetermined sequence, the method comprising: correlating the received data chirp signal with a first reference chirp signal comprising a symbol sequence matching the primary predetermined sequence, so as to form a first correlator output; correlating the received data chirp signal with a second reference chirp signal comprising a symbol sequence matching the secondary predetermined sequence, so as to form a second correlator output; comparing the first and second correlator outputs so as to identify the first symbol value sequence encoded in the data chirp signal; decoding first data via the identified first symbol value sequence; and decoding second data via the second symbol value sequence.

Suitably, the method further comprises determining to maintain current link parameters if the identified first symbol value sequence matches the primary predetermined sequence.

Suitably, the first data encodes a link parameter renegotiation request, and the method further comprises implementing the requested link parameter.

Suitably, the first symbol value sequence is selected from values in the primary predetermined sequence, the secondary predetermined sequence and at least one further predetermined sequence, the method further comprising: correlating the received data chirp signal with at least one further reference chirp signal comprising a symbol sequence matching the at least one further predetermined sequence, so as to form at least one further correlator output; and comparing the first, second, and at least one further correlator outputs so as to identify the first symbol value sequence encoded in the data chirp sequence.

According to a third aspect, there is provided a transmitter for communicating a data chirp signal to a receiver, the data chirp signal comprising a sequence of symbols, each symbol encoding a first symbol value and a second symbol value such that the data chirp signal comprises a first symbol value sequence and a second symbol value sequence, the first and second symbol values being encoded via different properties of the symbol, the first symbol value sequence being selected from values in a primary predetermined sequence and a secondary predetermined sequence, the transmitter comprising: a selector configured to select consecutive values of the first symbol value sequence from values in consecutive sequence positions of the primary predetermined sequence and the secondary predetermined sequence; a first encoder configured to encode first data in the chirp signal via the selected first symbol value sequence; a second encoder configured to encode second data in the chirp signal via the second symbol value sequence; and a transmitter module configured to transmit the data chirp signal to the receiver.

Suitably, the transmitter is further configured to: determine a drift between the transmitter and the receiver; and determine that the drift is greater than a threshold value, wherein the first data encodes a request to increase the bandwidth of chirp communications between the transmitter and the receiver.

Suitably, each symbol comprises one or more identical chirps, and the transmitter is further configured to: determine a quality of the link between the transmitter and the receiver; and determine that the link quality is below a threshold value, wherein the first data encodes a request to increase the length of each chirp in each symbol.

According to a fourth aspect, there is provided a receiver for receiving a data chirp signal, the data chirp signal comprising a sequence of symbols, each symbol encoding a first symbol value and a second symbol value such that the data chirp signal comprises a first symbol value sequence and a second symbol value sequence, the first and second symbol values being encoded via different properties of the symbol, the first symbol value sequence being selected from values in a primary predetermined sequence and a secondary predetermined sequence, the receiver comprising: a correlator configured to correlate the received data chirp signal with a first reference chirp signal comprising a symbol sequence matching the primary predetermined sequence, so as to form a first correlator output; the correlator further configured to correlate the received data chirp signal with a second reference chirp signal comprising a symbol sequence matching the secondary predetermined sequence, so as to form a second correlator output; a comparator configured to compare the first and second correlator outputs so as to identify the first symbol value sequence encoded in the data chirp signal; a decoder configured to decode first data via the identified first symbol value sequence; and the decoder further configured to decode second data via the second symbol value sequence.

Suitably, the first data encodes a link parameter renegotiation request, and the receiver is further configured to implement the requested link parameter.

Suitably, the first symbol value sequence is selected from values in the primary predetermined sequence, the secondary predetermined sequence and at least one further predetermined sequence, and the correlator is further configured to correlate the received data chirp signal with at least one further reference chirp signal comprising a symbol sequence matching the at least one further predetermined sequence, so as to form at least one further correlator output; and the comparator configured to compare the first, second, and at least one further correlator outputs so as to identify the first symbol value sequence encoded in the data chirp sequence.

BRIEF DESCRIPTION OF THE DRAWINGS

The following disclosure will now be described by way of example with reference to the accompanying drawings. In the drawings.

DETAILED DESCRIPTION

The following disclosure is directed at an efficient method of encoding data in a chirp signal. Each symbol of a chirp signal has a plurality of configurable properties, for example its cyclic shift value, bandwidth, number of repeats, gradient and its centre frequency. Data is encoded in the chirp signal via at least two of these configurable properties.

For example, in addition to encoding the main data value via the cyclic shift of each symbol, an additional data value is also encoded via the gradient of each symbol. The quantity of data which can be encoded in the chirp signal is therefore increased compared to a signal in which data is encoded only via one property. The following disclosure describes a method of embedding main data and additional data using more than one configurable property of the chirp signal. As an example, two predetermined sequences of gradient symbol values are defined to transmit the additional data. These sequences are known to both the transmitter and receiver. The first sequence is used to encode a binary-0 and the second sequence encodes a binary-1. For each binary digit of the additional data to be transmitted the transmitter selects a corresponding gradient from either, the first sequence in the case of a binary-0, or the second sequence in the case of a binary-1. For example, if the additional data to be transmitted starts 110, then the first gradient of the second sequence is selected, followed by the second gradient of the second sequence, followed by the third gradient of the first sequence. The receiver is configured to correlate the received chirp signal against both a signal having the first predetermined sequence of symbol values, and a signal having the second predetermined sequence of symbol values. For each symbol received, and under normal operating conditions, only one correlation will generate a significant peak for each received symbol. The correlation with the largest peak determines the value of the additional data value for each received symbol. The position of the largest peak within that correlation output determines the main data value. The receiver is thereby able to decode both the main data value and additional data value of each symbol in the chirp signal. The process will be described further in the examples that follow.

As previously described, a chirp in the chirp signal can be represented by a sequence of N samples. One or more identical contiguous chirps can form a symbol that represents a data value to be communicated. Mathematically, a chirp signal can be represented as:

$$C(g,p) = e^{j\pi g(n - fn(p))(n+1 - fn(p))/N} \quad \text{(equation 1)}$$

where g is the gradient of the chirp, N is the number of samples in the sequence, n is a sample in the sequence, p is a cyclic shift symbol value, fn(p) is a function that encodes p onto the received chirp, which implicitly may also be a function of g, n, N and other constants, and C is the received chirp sequence, which is normally evaluated for all integer values of n from 0 to N−1 in order. The number of valid values of p is the symbol set size, which is nominally N. However, the symbol set size can be more or less than N depending on the quality of the link. The value of g can have any value greater than 0 and less than N. Preferably, g is an integer between 1 and N−1. Due to the modular nature of this expression negative gradients are obtained from N−1 backwards. Hence, N−2 is equivalent to a negative gradient of −2. Where there are more than one identical contiguous chirps in a symbol, each chirp individually conveys the same value which is the cyclic shift symbol value of the symbol.

Chirp signals have several properties which are configurable by a transmitter. Each of these configurable properties can be used by a transmitter to encode a symbol value. Different symbol values can be conveyed by modifying one or more of the following configurable properties:

the gradient of each symbol,
the centre frequency of each symbol,
the number of samples, N, in each chirp,
the bandwidth of each symbol,
the repeat count: the number of times a chirp is repeated in a symbol,
the fractional cyclic offset symbol value p from equation 1 and,
the integer cyclic offset symbol value p from equation 1.

When a receiver is synchronised to a transmitter, such that each symbol is free from timing or frequency errors, and in the absence of implementation or channel imperfections or interference, and when equation 1 is evaluated with integer values of p, the corresponding correlator output peak will occupy a single sample. In the ideal case the remaining samples would be zero. It is an easy matter to relate that peak position with the transmitted integer symbol by solving equation 1 for p. It is also possible to evaluate equation 1 with non-integer values of p, such that p not only contains an integer part, but also an additional fractional part that conveys additional information. This has the effect of creating multiple correlator outputs. For the case where fn(p)=p/g, the position of the main correlator peak determines the integer offset and the relative magnitudes of the samples on either side determines the fractional offset. The accuracy, and therefore information content, of the fractional offset is subject to real world imperfections. In some instances the additional information may be unreliable. Typically, an additional means is required to assess the accuracy of the fractional offset before it is used.

Suitably, first data and second data are encoded in the chirp signal. Suitably, more than one of the above properties is used to convey the first and second data in the chirp signal. A combination of any two or more of these properties may be used to encode data in the chirp signal by the transmitter.

Each of these properties of chirps has associated physical properties and constraints, which may determine how and when they are used. Not all combinations of properties are necessarily orthogonal and in some cases there may be practical limitations. For example, the number of times a chirp is repeated may impose limitations on the subsequent chirp. For example, the subsequent chirp may alter some other property in order to determine the end of the symbol.

Suitably, a symbol value comprises a first data and a second data. Suitably, the second data is the main data encoded in the symbol. Suitably, the first data is additional data encoded in the symbol. Suitably, the main data value encodes the payload of a message. Suitably, the main data value is encoded using the integer symbol value p as this is the most efficient for a receiver to decode. Suitably, additional data values are encoded using one or more of the other chirp properties. The additional data values may be used to encode control information. The additional data values may be used to encode additional FEC bits. The additional data values may be used to enhance the overall data rate. The number of bits of additional data may vary from symbol to symbol. For example, there may be no additional data in some symbols. These symbols comprise only main data. In other symbols there may be additional data, for example that is used to transmit control information. Suitably, in order to indicate that a symbol encodes additional data as well as main data, a preceding symbol includes a flag. This flag may, for example, be included in the main data of the preceding symbol. Alternatively, the receiver is configured to look for alternative data in parallel with main data. Suitably, this is achieved by performing additional measurements of the known properties that each symbol takes.

The integer cyclic offset symbol value p from equation 1 can be considered to be related to the cyclic phase of the N samples in a chirp. These N samples are cyclically shiftable. The particular cyclically shifted position of the samples in the chirp relative to a default position defines the integer cyclic offset symbol value p. There are N different cyclic phases of a chirp, and hence, in this example, there are N different possible integer cyclic offset symbol values p. The amount of data that is conveyed by the integer cyclic offset symbol value p of one symbol depends on the value of N. For example, if N is 257 then there are 257 different possible symbol values p. Consequently, the detected integer cyclic offset symbol value p could be used to convey approximately 8 bits of data. For example, if p is 10 then this could be interpreted as the 8 bits 00001010. Similarly, if p is 40 then this could be interpreted as the 8 bits 00101000. Further bits can be encoded by whether the chirp is an up-chirp or a down-chirp. Similarly, the amount of data that is conveyed by each of the other configurable properties depends on how many different possible values there are for that property.

Figure 3:
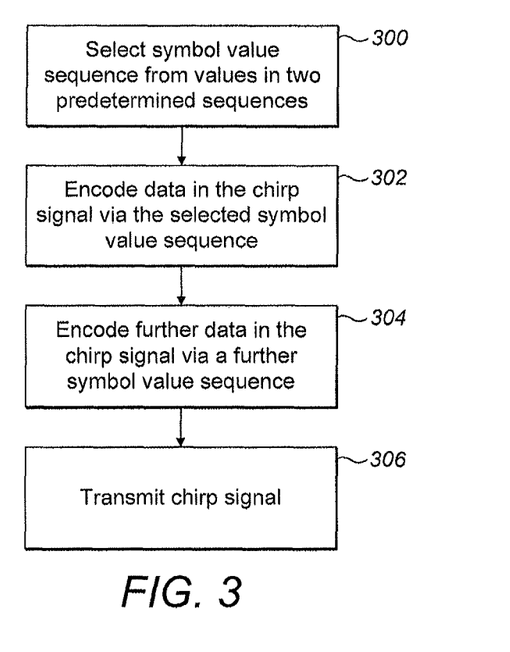
FIG. 3 is a flow chart illustrating a method of communicating a data chirp signal.

Reference is now made to FIG. 3, which illustrates a method of communicating a data chirp signal from a transmitter. The data chirp signal comprises a sequence of symbols. Each symbol encodes a main symbol value and an additional symbol value. Thus, the data chirp signal comprises at least two symbol value sequences. Each symbol value sequence is encoded via a different property of the symbol, preferably selected from the following properties: the gradient of a symbol, the centre frequency of a symbol, the number of samples, N, in a chirp, the bandwidth of a symbol, the number of times a chirp is repeated in a symbol, and the integer and fractional symbol value p from equation 1.

Figure 4A:
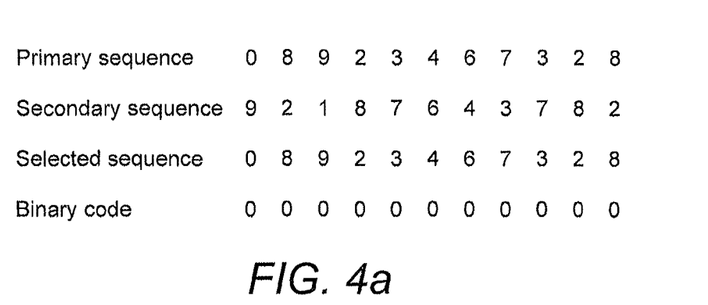
FIGS. 4a and 4b illustrate example symbol value sequences.
Figure 4B:
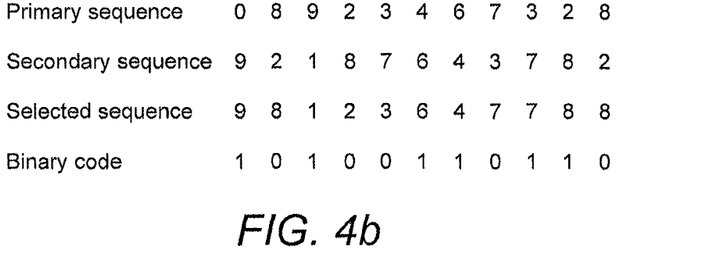

Suitably, the values of one of the symbol value sequences are selected from values in a primary predetermined sequence and a secondary predetermined sequence. These predetermined sequences are known to the transmitter and the receiver. Suitably, the transmitter and the receiver negotiate these predetermined sequences prior to communication of the chirp signal. For example, a first symbol value sequence encoded via the symbol gradient may be selected from the exemplary primary and secondary predetermined sequences illustrated in FIG. 4a. In this example, there are 10 different possible gradients, and hence 10 different possible symbol values. At step 300 in FIG. 3, the transmitter selects a symbol value sequence from values in the two predetermined sequences. Consecutive values of the selected symbol value sequence are chosen from values in consecutive sequence positions of the primary and secondary predetermined sequences. FIGS. 4a and 4b illustrate this concept. In FIG. 4a, each value in the selected symbol value sequence is chosen from the primary predetermined sequence. In FIG. 4b, the first value in the selected symbol value sequence is chosen to be the first value of the secondary predetermined sequence. The second value in the selected symbol value sequence is chosen to be the second value from the primary predetermined sequence, and so on.

At step 302 of FIG. 3, data is encoded in the chirp signal via the selected symbol value sequence. For example, a binary code can be embedded via the selected symbol value sequence. For example, if the primary predetermined sequence values represent '0' bits in binary, and the secondary predetermined sequence values represent '1' bits in binary, then the selected sequence of FIG. 4a reads 00000000000 and the selected sequence of FIG. 4b reads 10100110110. Suitably, the code has a specific meaning to both the transmitter and the receiver.

At step 304 of FIG. 3, further data is encoded in the chirp signal. This data is encoded via the second symbol value sequence. A different one of the configurable properties is used to encode this second symbol value sequence. As an example, if the selected symbol value sequence is conveyed via the gradients of the chirps, the second symbol value sequence may be encoded via the symbol value p.

At step 306, the transmitter transmits the encoded data chirp signal.

Suitably, the main data conveyed by the chirp signal is encoded via the symbol value p in accordance with step 304; and additional control information is encoded intermittently via the gradient or the centre frequency of the symbol in accordance with steps 300 and 302.

Suitably, the transmitter uses the selected symbol value sequence to encode information regarding the quality of the link between the transmitter and the receiver. For example, if the selected symbol value sequence entirely consists of values from the primary predetermined sequence, as illustrated in FIG. 4a, this may be interpreted by the receiver to mean that the current link parameters are acceptable to the transmitter. Suitably, the receiver responds to this information by maintaining the current link parameters. However, if the selected symbol value sequence consists of a mixture of values from the different predetermined sequences, as illustrated in FIG. 4b, this may be interpreted by the receiver as a link parameter renegotiation request. Suitably, the specific code transmitted specifies the requested change. For example, the code may request that the bandwidth of chirp communications between the transmitter and the receiver be increased. As a further example, the code may request that the length of each chirp in each symbol be increased to a particular value. Suitably, the receiver responds by implementing the requested link parameter.

Suitably, the primary predetermined sequence is chosen to consist of symbol values which have less likelihood of being used by other devices than the secondary predetermined sequence. For the case where the primary predetermined sequence is mostly selected for transmission, this minimises the possibility of cross talk with other devices.

Suitably, prior to transmitting a link parameter renegotiation request, the receiving circuitry in the transmitter measures the quality of the link between the transmitter and the receiver. For example, the receiving circuitry in the transmitter may measure the SNR (signal to noise ratio) or BER (bit error rate) of the link as a measure of the link quality. If the link quality is determined by the receiving circuitry of the transmitter to be below a threshold value, then it encodes the chirp signal with a link parameter renegotiation request. For example, the code may request that the communications between the transmitter and the receiver be continued with an increased chirp length in each symbol. Increasing the chirp length in each symbol increases the amount of coherent integration that can be performed on the received symbols, and hence increases the likelihood of accurately decoding the symbol value(s).

Suitably, prior to transmitting a link parameter renegotiation request, the receiving circuitry of the transmitter measures the drift between the transmitter and the receiver. For example, the receiving circuitry of the transmitter may measure the frequency drift, the timing drift, or a combination of both. If the drift is determined by the transmitter to be above a threshold value, then it encodes the chirp signal with a link parameter renegotiation request. For example, the code may request that the communications between the transmitter and the receiver be continued with an increased bandwidth. This enables shorter chirps to be used. Coherent integration of shorter chirps is more accurate that coherent integration of longer chirps when the drift between the transmitter and receiver is high.

Suitably, following receipt of a link parameter renegotiation request, the receiver returns an agreement code via the same method. Following this, communication between the transmitter and the receiver continues with the new renegotiated parameters.

Suitably, the method described with respect to FIG. 3 is extended such that the data encoded in the signal at step 302 is encoded via the selected symbol value sequence and also via a further symbol value sequence encoded via a further property of the chirp signal. So, for example the selected symbol value sequence illustrated in FIG. 4b may be conveyed via the gradients of the symbols in the chirp signal, and the further symbol value sequence may be conveyed via the centre frequency of the symbols. The selected symbol value sequence is interpreted differently by the receiver depending on the sequence of centre frequency symbol values of the received chirp signal. The number of distinct codes which can be embedded in the chirp signal is thereby increased. Further symbol value sequences can be incorporated into the data encoding of step 302 in the same way via further different configurable properties of the signal. This enables very secure messages to be communicated between the transmitter and the receiver.

Suitably, the method described with respect to FIG. 3 is extended such that the symbol value sequence selected at step 300 is selected from three or more predetermined sequences. As described with respect to FIG. 3, consecutive values of the selected symbol value sequence are selected from consecutive positions of the predetermined sequences. This extension to the method of FIG. 3 increases the number of distinct codes which can be embedded in the chirp signal.

Figure 5:
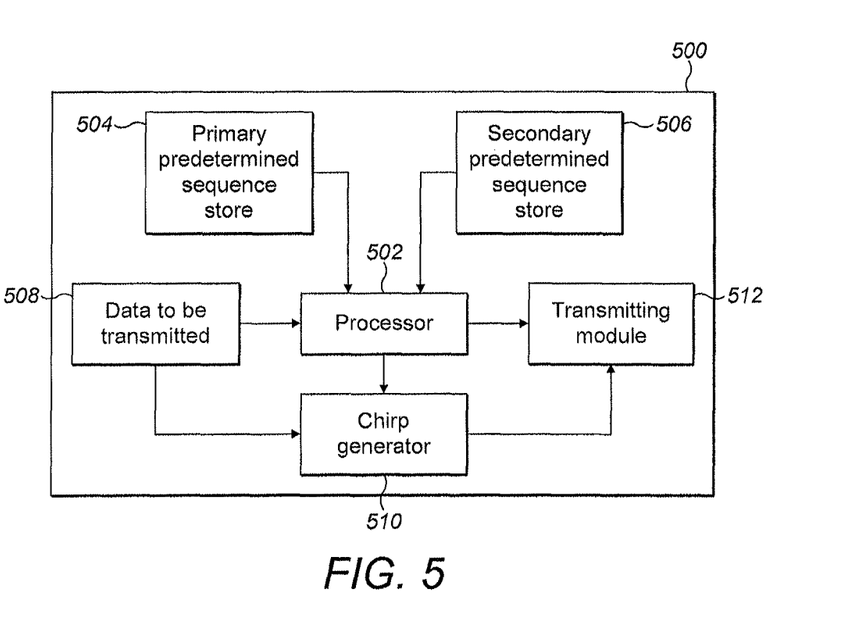
FIG. 5 illustrates a schematic diagram of the exemplary components of a chirp transmitter.

Reference is now made to FIG. 5 which is a schematic diagram of the exemplary components of a chirp transmitter according to the methods described herein. Suitably, the transmitter stores the two predetermined sequences of symbol values individually in store 504 and store 506. Store 504 and store 506 may be incorporated into a single store. Alternatively, the predetermined sequences may be stored within the processor 502. Further stores may be incorporated into the transmitter to store additional predetermined sequences. The processor 502 controls the operation of chirp generator 510 to generate the chirp signal to be transmitted. For example, chirp generator 510 generates chirps in accordance with equation 1 and the inputs it receives from the processor 502 and data to be transmitted 508. The chirp generator 510 encodes the main data onto the chirp signal, preferably via cyclic offset symbol value p. If further data is to be encoded onto the chirp signal, then processor 502 selects the symbol value sequence by selecting stored values from the predetermined sequences in accordance with the methods described with respect to FIG. 3. The processor then instructs the chirp generator to encode this further data onto the chirp signal via the chosen configurable property, for example the symbol gradient. The generated chirp signal is output from the chirp generator 510 to the transmitting module 512. The transmitting module 512 mixes up the generated chirp signal to the transmitted frequency. For example, transmitting module 512 mixes the generated chirp signal up to the transmitted frequency in accordance with the frequency hopping sequence input to the transmitting module 512 from the processor 502. Transmitting module 512 then transmits the mixed chirp signal to the receiver.

Figure 6:
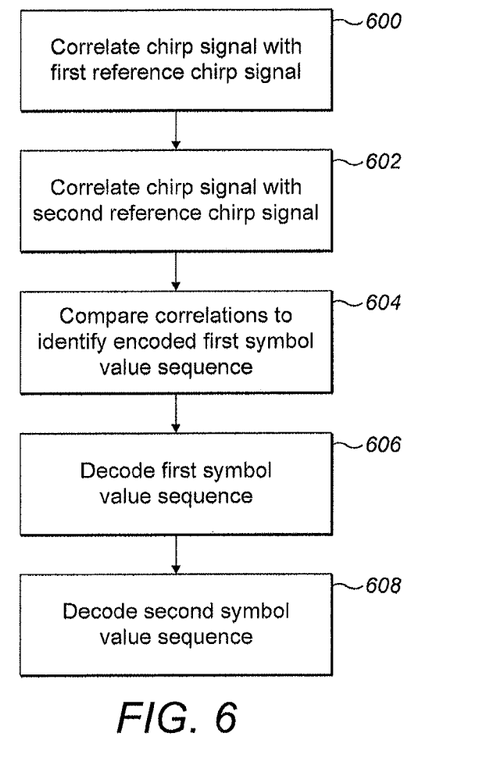
FIG. 6 is a flow chart illustrating a method of receiving a data chirp signal.

Reference is now made to FIG. 6, which illustrates the pertinent steps of an exemplary method of receiving a data chirp signal of the form transmitted according to the method of FIG. 3. The received data chirp signal comprises at least two symbol value sequences. One of these symbol value sequences has symbol values which match symbol values of one of two predetermined sequences known to the receiver. At step 600, the receiver correlates the received chirp signal with a first reference chirp signal having a symbol value sequence matching the first of the predetermined sequences. At step 602, the receiver correlates the received chirp signal again this time with a second reference chirp signal which has a symbol value sequence matching the second of the predetermined sequences. These correlations may be performed contemporaneously at different correlators. Alternatively, the correlations may be performed by the same correlator at different times. At step 604, the receiver compares the correlator outputs of steps 600 and 602. The correlation peaks identify whether each symbol value in the received sequence matches a symbol value in the first predetermined sequence or the second predetermined sequence. The receiver thereby determines the transmitted symbol value sequence. At step 606, the receiver decodes the symbol value sequence to yield data. At step 608, the receiver decodes the other symbol value sequence to yield further data. Suitably, the main data conveyed by the chirp signal is encoded via the cyclic offset symbol value p and decoded at step 608; and additional control information is encoded intermittently via the gradient or centre frequency of the symbol and decoded at step 606.

If the data decoded from one of the symbol value sequences is control information requesting that the current link parameters are modified, the receiver suitably responds by determining if it is able to implement the change. Preferably, if the receiver determines that it is able to implement the change, then it implements the requested link parameter. The receiver may further respond by returning an agreement code to the transmitter. Suitably, this agreement code is embedded in a chirp signal using the method described in steps 300 and 302 of FIG. 3. Suitably, the agreement code is sent to the transmitter using the current link parameters prior to implementing the requested link parameter. However, if the receiver determines that it is unable to make the change, then it does not implement the requested link parameter. The receiver may further respond by returning a decline code to the transmitter. Suitably, this decline code is embedded in a chirp signal using the method described in steps 300 and 302 of FIG. 3.

For the case that one of the symbol value sequences has symbol values selected from more than two predetermined sequences known to the receiver, then the receiver correlates the received chirp signal against reference chirp signals having each of the predetermined sequences, and compares all of these correlation results in order to identify the encoded symbol value sequence.

It is understood that the correlations discussed in steps 600 and 602 may be implemented in practice by first multiplying the received chirp with a generated chirp and then using a unity correlator to correlate the multiplied chirp with a fixed correlating chirp. Performing the correlation in this way simplifies the circuitry. This method is explained in more detail with respect to FIG. 7.

Figure 7:
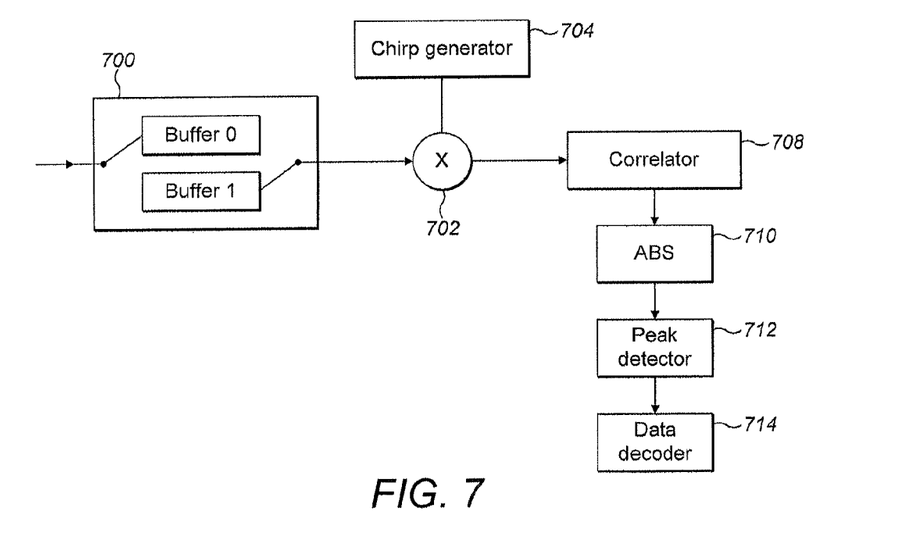
FIG. 7 illustrates a schematic diagram of a chirp receiver.

Reference is now made to FIG. 7 which is a schematic diagram of the exemplary components of a general chirp receiver.

A chirp signal is received at the chirp receiver and the samples of a received chirp of the chirp signal are input to buffer module 700. Suitably, buffer module 700 comprises two buffers. This enables an input buffer to be receiving samples whilst the output buffer is being read. When the input buffer becomes full the two buffers are swapped over so that input samples can continue to be sampled and stored without loss. The output buffer may be read multiple times. With suitably fast digital processing clock rates these buffers can provide a means to decode and track received chirps in real time. The received chirp samples output from the buffer module 700 are input to chirp multiplier 702.

Chirp generator 704 generates a reference chirp which has a gradient g' which differs from the expected gradient g of the chirp output from the buffer module 700 by a fixed value v. Preferably, this fixed value is 1. Preferably, g−g'=1. Preferably, the reference chirp has the same number of samples in a chirp N, sample rate (bandwidth) and centre frequency as the chirp output from the buffer module 700 is expected to have by the receiver.

Suitably, the chirp multiplier 702 multiplies the received chirp with the conjugate of the reference chirp generated by chirp generator 704. The mixed chirp output from the chirp multiplier 702 is input to correlator 708.

Figure 8:
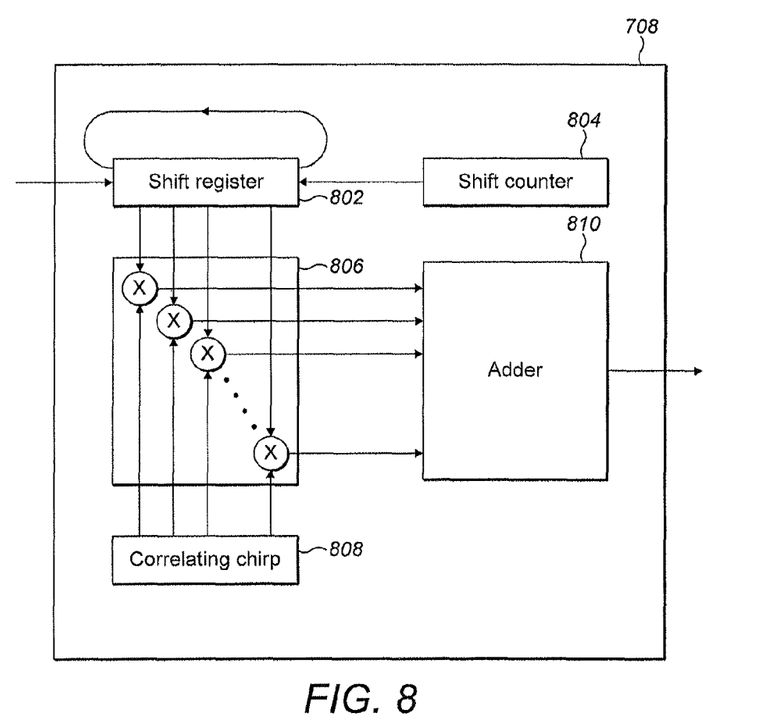
FIG. 8 illustrates a schematic diagram of a chirp correlator.

The correlator 708 correlates the mixed chirp with a conjugate of the fixed correlating chirp. The fixed correlating chirp has a gradient which is equal to the fixed value v. Preferably, the fixed correlating chirp has unity gradient. FIG. 8 illustrates a more detailed diagram of an exemplary correlator 708. The N samples of the mixed chirp signal output from chirp multiplier 702 are first loaded into N-stage circular shift register 802. The fixed gradient correlating chirp signal consists of one chirp of N samples which are preloaded into correlating chirp module 808. The shift counter 804 is preloaded with the number of shifts, and hence the number of outputs of correlator 708. During normal operation shift counter 804 is preloaded with N, but when using reduced symbol alphabets or if N is non-prime then shift counter 804 could be less than N. The correlator 708 comprises N complex multipliers 806, each taking a complex input from the N-stage circular shift register 802 samples, and the corresponding complex input from the correlating chirp module 808. The output from the N complex multipliers is then summed at adder 810 to yield a single complex correlator sample that is output from the correlator 708. For each successive correlation, the N-stage circular shift register 802 rotates by one. If the sample at the beginning of the N-stage circular shift register is s for one correlation, then the sample at the beginning of the N-stage circular register is s−1 for the next correlation. In this way, the correlator performs a correlation between the fixed gradient correlating chirp and N cyclic phases of the mixed chirp, generating N outputs. When the received chirp, the reference chirp and fixed correlating chirp have gradients such that g−g'≠v, then the correlator outputs small values for all cyclic phases. This is the case when the chirp receiver is not configured to correctly receive the chirp signal. When the received chirp, the reference chirp and fixed correlating chirp have gradients such that g−g'=v, the correlator outputs a strong correlation peak when the cyclic phase of the mixed chirp matches that of the fixed gradient correlating chirp and smaller values in other positions.

As described in relation to FIG. 6, a plurality of correlations is performed. Suitably, each of these correlations is performed by correlator 708. The received chirp signal is read from the output buffer multiple times in order to provide copies of the received chirp signal which are then mixed with different generated chirps and correlated with the fixed correlating chirps.

Suitably, the output of the correlator 708 is input to an absolute value module 710. The absolute value module returns the magnitude of the complex input signal from the correlator 708. Peak detection module 712 then detects the position of the correlation peak. The position of the correlation peak identifies the symbol values of the chirp. Data decoder 714 decodes the data encoded in the chirp from the symbol values of the chirp.

Figure 9:
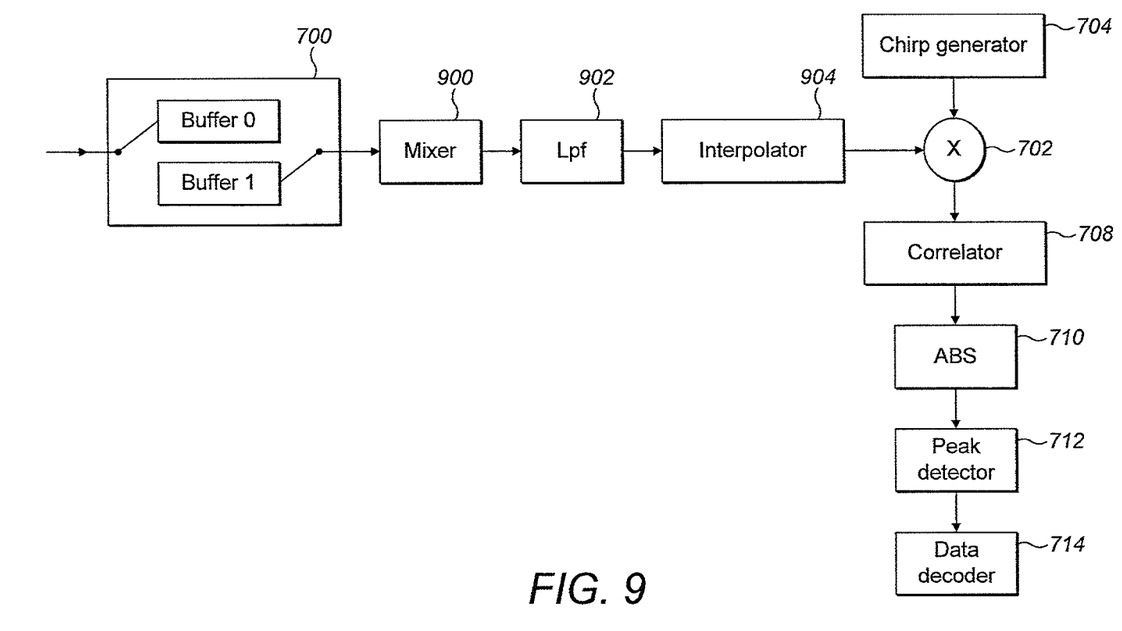
FIG. 9 illustrates a schematic diagram of a further chirp receiver.

Reference is now made to FIG. 9 which is a schematic diagram of the exemplary components of a further chirp receiver. This receiver operates in the same manner as the receiver of FIG. 7, but further incorporates some extra components. The receiver of FIG. 9 is applicable to the case that a symbol value sequence is encoded via the centre frequency of the received chirp signal. The receiver does not know in advance what the centre frequency of each symbol is. As an example, the signal channels are 100 kHz, and the whole bandwidth is 800 kHz. The receive buffer 700 acquires samples that span the whole bandwidth. The received signal is only in one 100 kHz channel, and hence only in some of the acquired samples. The receive buffer is read multiple times. On each reading a different frequency band is isolated by means of the mixer 900 and the low pass filter 902. The mixer 900 mixes the frequency of the samples down to DC and the low pass filter 902 rejects all frequencies except the selected frequency band. The interpolator 904 interpolates the sample rate down to the chirp sample rate. In this example, the interpolator interpolates down from 800 kHz to 100 kHz. The frequency mixed chirp is then multiplied with a generated chirp and correlated as described with reference to FIG. 7. Correlator peaks for all the frequency bands are generated. The peak detector detects the largest peak which identifies the frequency of that symbol. The data decoder translates this frequency into received data.

Suitably, the peak detector 712 is configured to measure the quality of the link between the transmitter and the receiver. For example, the peak detector may be configured to measure the signal to noise ratio (SNR). The peak detector may measure the SNR by dividing the peak amplitude by the root mean square of the remaining samples excluding outliers. Suitably, the result is then normalised to provide the SNR.

Suitably, the chirp signal in buffer 700 is read a plurality of times with different settings. For example, in order to determine the timing drift between the transmitter and the receiver, the chirp signal is suitably sampled a plurality of times. The chirp signal is sampled at a nominal time period which is that that the receiver considers to be the time period occupied by a received chirp. In the following, this signal is called the prompt signal. Suitably, the chirp signal is sampled at further time periods, each offset from the others. For example, suitably the chirp signal is sampled earlier and later than the nominal time period. For example, the earlier signal may be sampled about ⅓ of a sample earlier than the prompt signal, and the later signal may be sampled about ⅓ of a sample later than the prompt signal. Further subdivisions of the chirp signal may be made to increase the accuracy of the timing measurement. Each sampled chirp is correlated with a generated chirp. The peak detector analyses the correlation peaks of the differently sampled chirps. The position of the highest peak from all differently sampled chirps indicates the integer and fractional time offset. For example, if the early signal (described above) has a larger peak than the prompt or late signals then the peak detector determines that the time offset is −⅓ of a sample. The position of the peak relative to its expected position is the integer offset scaled by g and modulo N. Typically, in a synchronised receiver, the integer offset is zero. An estimate of the time period of the received chirp compared to the nominal time period of the receiver provides a measure of the timing drift of the transmitter's and receiver's crystals. Suitably, the peak detector interpolates the peak magnitude and sample magnitudes, g samples either side of the largest peak, in order to provide a more accurate estimate of the timing drift. If repeated over time, a rate of change of the timing drift can be determined.

In order to determine the frequency drift between the transmitter and the receiver, the chirp signal is read from buffer 700 a plurality of times. Each time the signal is read it is correlated against a different reference chirp generated by chirp generator 704. Each of these generated chirps has a frequency band offset from the other generated chirps. Typically, these frequency bands are overlapping. Suitably, the generated chirps are generated at the nominal frequency band that the receiver expects the received chirp to occupy, and at a higher and lower frequency band to the nominal frequency band. The first time a chirp is read it is multiplied in the chirp multiplier 702 by a first one of the generated chirps. The second time the chirp is read it is multiplied in the chirp multiplier 702 by a second one of the generated chirps, and so on. The peak detector selects the frequency band that produces the largest overall peak from correlator 708 when mixed with all generated chirps. Further accuracy is achieved by using more overlapping frequency bands. An estimate of the frequency band occupied by the received chirp compared to the nominal frequency band of the receiver provides a measure of the frequency drift between the transmitter's and receiver's crystals. Suitably, the peak detector interpolates the sample magnitudes either side of the largest overall peak in order to provide a more accurate estimate of the frequency drift. If repeated over time, a rate of change of the frequency drift can be determined.

The described method enables a code to be embedded, for example a renegotiation code, into the chirp signal on top of the normal payload of the chirp signal. It is an efficient method of data transfer because it does not use up a portion of the normal payload in order to convey additional data about the link. This is particularly useful for low power devices communicating using low data rates. It also allows the transmission to remain deterministic, because the additional information is overlaid on the chirp signal as and when desired by the transmitter without increasing the length of the transmissions. Since the additional information is likely to be intermittent, if this is incorporated into the normal payload then extra packets would be intermittently transmitted by the transmitter. Consequently, the transmission would not be deterministic for the receiver.

FIGS. 5, 7, 8 and 9 illustrate schematic diagrams showing exemplary components of receivers, a correlator and a transmitter according to the methods described herein. These figures illustrate the layout of these devices in terms of functional boxes. The operations of one or more of these functional boxes may be combined. It is understood that these figures do not illustrate those conventional components of these devices known to a person skilled in the art.

In a specific example, the received chirp signal comprises chirps, wherein each chirp is described by a Zadoff-Chu code. Suitably, contiguous chirp symbols have different Zadoff-Chu codes. Suitably, contiguous chirp symbols also have different centre frequencies. Using different Zadoff-Chu codes for each symbol provides a degree of coded separation, allowing more than one user to use the frequency spectrum at the same time.

Suitably, the receiver and transmitter described herein are implemented in a system operating according to Bluetooth protocols.

Preferably, the receiver and transmitter described herein are implemented in hardware. Alternatively, the receiver and transmitter described herein may be implemented in software.

Suitably, the receiver and transmitter described herein are implemented in long range radio communications. Typically, chirps are used for implementations that use a low data rate and low power. The receiver and transmitter are suitable for use in high-sensitivity radio communications. Example implementations of the receiver and transmitter are in a temperature sensor, a walkie talkie or a wireless headset.

The applicant draws attention to the fact that the present invention may include any feature or combination of features disclosed herein either implicitly or explicitly or any generalisation thereof, without limitation to the scope of any of the present claims. In view of the foregoing description it will be evident to a person skilled in the art that various modifications may be made within the scope of the invention.

The invention claimed is:

1. A method of communicating a data chirp signal from a transmitter to a receiver, the data chirp signal comprising a sequence of symbols, each symbol encoding a first symbol value and a second symbol value such that the data chirp signal comprises a first symbol value sequence and a second symbol value sequence, the first and second symbol values being encoded via different properties of the symbol, the first symbol value sequence being selected from values in a primary predetermined sequence and a secondary predetermined sequence, the method comprising:

selecting consecutive values of the first symbol value sequence from values in consecutive sequence positions of the primary predetermined sequence and the secondary predetermined sequence;

encoding first data in the chirp signal via the selected first symbol value sequence;

encoding second data in the chirp signal via the second symbol value sequence; and transmitting the data chirp signal to the receiver.

2. A method as claimed in claim 1, wherein the first data encodes a link parameter renegotiation request.

3. A method as claimed in claim 2, further comprising:

determining a drift between the transmitter and the receiver; and determining that the drift is greater than a threshold value, wherein the first data encodes a request to increase the bandwidth of chirp communications between the transmitter and the receiver.

4. A method as claimed in claim 2, each symbol comprising one or more identical chirps, further comprising:

determining a quality of the link between the transmitter and the receiver; and determining that the link quality is below a threshold value, wherein the first data encodes a request to increase the length of each chirp in each symbol.

5. A method as claimed in claim 1, the first symbol values being encoded via the gradients of the symbols.

6. A method as claimed in claim 1, the first symbol values being encoded via the centre frequencies of the symbols.

7. A method as claimed in claim 1, each symbol's first symbol value being encoded via the bandwidth of the symbol.

8. A method as claimed in claim 1, each symbol comprising one or more identical chirps, each symbol's first symbol value being encoded via the length of each chirp in the symbol.

9. A method as claimed in claim 1, further comprising each symbol encoding at least one further symbol value such that the data chirp signal comprises at least one further symbol value sequence, the at least one further symbol value being encoded via a different property of the symbol to the first and second symbol values, wherein encoding first data comprises encoding first data in the chirp signal via the selected first symbol value sequence and via the at least one further symbol value sequence.

10. A method as claimed in claim 9, wherein the at least one further symbol value is encoded via one of: the gradient of the symbol, the centre frequency of the symbol, the length of each chirp in the symbol, and the bandwidth of each symbol.

11. A method as claimed in claim 1, wherein the first symbol value sequence is selected from values in the primary predetermined sequence, the secondary predetermined sequence and at least one further predetermined sequence, the method comprising selecting consecutive values of the first symbol value sequence from values in consecutive sequence positions of the primary predetermined sequence, the secondary predetermined sequence and the at least one further predetermined sequence.

12. A transmitter for communicating a data chirp signal to a receiver, the data chirp signal comprising a sequence of symbols, each symbol encoding a first symbol value and a second symbol value such that the data chirp signal comprises a first symbol value sequence and a second symbol value sequence, the first and second symbol values being encoded via different properties of the symbol, the first symbol value sequence being selected from values in a primary predetermined sequence and a secondary predetermined sequence, the transmitter comprising:

a selector configured to select consecutive values of the first symbol value sequence from values in consecutive sequence positions of the primary predetermined sequence and the secondary predetermined sequence;

a first encoder configured to encode first data in the chirp signal via the selected first symbol value sequence;

a second encoder configured to encode second data in the chirp signal via the second symbol value sequence; and a transmitter module configured to transmit the data chirp signal to the receiver.

13. A transmitter as claimed in claim 12, further configured to:

determine a drift between the transmitter and the receiver; and determine that the drift is greater than a threshold value, wherein the first data encodes a request to increase the bandwidth of chirp communications between the transmitter and the receiver.

14. A transmitter as claimed in claim 12, each symbol comprising one or more identical chirps, the transmitter further configured to:

determine a quality of the link between the transmitter and the receiver; and determine that the link quality is below a threshold value, wherein the first data encodes a request to increase the length of each chirp in each symbol.

* * * * *